United States Patent
Gupta

(10) Patent No.: US 11,132,384 B2
(45) Date of Patent: Sep. 28, 2021

(54) GENERATING A MULTI-COLUMN INDEX FOR RELATIONAL DATABASES BY INTERLEAVING DATA BITS FOR SELECTIVITY

(71) Applicant: Amazon Technologies, Inc., Seattle, WA (US)

(72) Inventor: Anurag Windlass Gupta, Atherton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 215 days.

(21) Appl. No.: 16/549,669

(22) Filed: Aug. 23, 2019

(65) Prior Publication Data

US 2019/0377743 A1    Dec. 12, 2019

Related U.S. Application Data

(63) Continuation of application No. 13/953,432, filed on Jul. 29, 2013, now Pat. No. 10,394,848.

(51) Int. Cl.
*G06F 16/28* (2019.01)
*G06F 16/22* (2019.01)
*G06F 16/27* (2019.01)

(52) U.S. Cl.
CPC ............ *G06F 16/283* (2019.01); *G06F 16/22* (2019.01); *G06F 16/221* (2019.01); *G06F 16/2228* (2019.01); *G06F 16/27* (2019.01)

(58) Field of Classification Search
CPC ...... G06F 16/283; G06F 16/22; G06F 16/221; G06F 16/2228
USPC ........................................................ 707/600
See application file for complete search history.

(56) References Cited

U.S. PATENT DOCUMENTS

| | | | |
|---|---|---|---|
| 5,918,225 | A | 6/1999 | White et al. |
| 5,924,088 | A | 7/1999 | Jakobsson et al. |
| 7,450,438 | B1 * | 11/2008 | Holst ...................... H04L 12/66 365/189.07 |
| 7,647,291 | B2 | 1/2010 | Mosescu |
| 7,809,759 | B1 | 10/2010 | Bruso et al. |
| 7,827,218 | B1 | 11/2010 | Mittal |
| 9,058,357 | B1 | 6/2015 | Birnbaum et al. |
| 2004/0148293 | A1 * | 7/2004 | Croisettier .......... G06F 16/2272 |
| 2004/0177065 | A1 | 9/2004 | Tropf |
| 2005/0027692 | A1 * | 2/2005 | Shyam .............. G06F 16/24557 |
| 2008/0086470 | A1 | 4/2008 | Graefe |
| 2010/0011031 | A1 | 1/2010 | Huang et al. |

(Continued)

OTHER PUBLICATIONS

"Mining of Massive Datasets chapter 3: Finding Similar Items" Anand Rajaraman and Jeff Ulman 2010, pp. 1-59.

(Continued)

*Primary Examiner* — Kimberly L Wilson
(74) *Attorney, Agent, or Firm* — Robert C. Kowert; Kowert, Hood, Munyon, Rankin & Goetzel, P.C.

(57) ABSTRACT

A multi-column index is generated based on an interleaving of data bits for selectivity for efficient processing of data in a relational database system. Two or more columns may be identified for inclusion in the multi-column index for a relational database table. Based, at least in part, on the interleaving of data bits for selectivity from the identified columns, a multi-column index is generated for the relational database table that provides a respective index value for each entry in the relational database table. The entries of the relational database table may then be stored according to the index values of the multi-column index.

20 Claims, 10 Drawing Sheets

(56) References Cited

U.S. PATENT DOCUMENTS

| | | | |
|---|---|---|---|
| 2010/0082654 A1 | 4/2010 | Zhang et al. | |
| 2010/0185692 A1 | 7/2010 | Zhang et al. | |
| 2010/0281013 A1 | 11/2010 | Graefe | |
| 2011/0213775 A1 | 9/2011 | Franke et al. | |
| 2011/0246432 A1 | 10/2011 | Yang et al. | |
| 2012/0072656 A1 | 3/2012 | Archak et al. | |
| 2012/0078904 A1 | 3/2012 | Huang et al. | |
| 2012/0323923 A1 | 12/2012 | Duan | |
| 2013/0031051 A1 | 1/2013 | Mujumdar et al. | |
| 2013/0046949 A1 | 2/2013 | Colgrove et al. | |
| 2013/0104251 A1 | 4/2013 | Moore et al. | |
| 2013/0117255 A1* | 5/2013 | Liu | G06F 16/283 707/714 |
| 2014/0127562 A1 | 5/2014 | Nesper et al. | |
| 2014/0172804 A1* | 6/2014 | Kaufmann | G06F 16/2228 707/649 |
| 2014/0201132 A1 | 7/2014 | Konik et al. | |
| 2014/0280375 A1 | 9/2014 | Rawson et al. | |

OTHER PUBLICATIONS

"Multidimensional Range Search in Dynamically Balanced Trees" Tropf and Herzog, Applied Informatics 1981, pp. 1-7.

"Oracle Essbase Aggregate Storage Option Benchmark on Oracle Sun Enterprise M5000 Server" Whitepaper, Apr. 2010, pp. 1-21.

Search Report and Written Opinion form Singapore Application No. 11201600613U, Date Nov. 11, 2016, Amazon Technologies, Inc., pp. 1-9.

Office Action from Japanese Patent Application No. 2016-531804, dated Feb. 14, 2017 (English translation and Japanese version), pp. 1-5.

Nobukazu Suzuki, et al., "Data Distribution for Similarity Retrieval on Peer-to-Peer Network", Information Processing Society of Japan, IPSJ SIG Technical Report, Nov. 28, 2008, pp. 55-60, NII-Electronic Library Service.

Office Action from Japanese Application No. 2016-531804, dated Jan. 26, 2018, Amazon Technologies, Inc., pp. 1-6.

Extended European Search Report from PCTéUS2014048531, dated Apr. 21, 2017, Amazon Technologies, Inc., pp. 1-8.

Amazon Web Services, "Amazon Redshift Database Developer Guide API Version Dec. 1, 2012", Retrieved from URL: http://docs.aws.amazon.com/redshift/latest/dg/c_redshift_system_overview.html, pp. 1-841.

Written Opinion from Singapore Application No. 11201600613U, dated Aug. 1, 2017, Amazon Technologies, Inc., pp. 1-5.

International Search Report and Written Opinion from PCT/US14/48531, dated Nov. 6, 2014, Amazon Technologies, Inc., pp. 1-12.

* cited by examiner

GENERATING A MULTI-COLUMN INDEX FOR RELATIONAL DATABASES BY INTERLEAVING DATA BITS FOR SELECTIVITY

This application is a continuation of U.S. patent Ser. No. 13/953,432, filed Jul. 29, 2013, which is hereby incorporated by reference herein in its entirety.

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data storage and data management.

Figure 1:
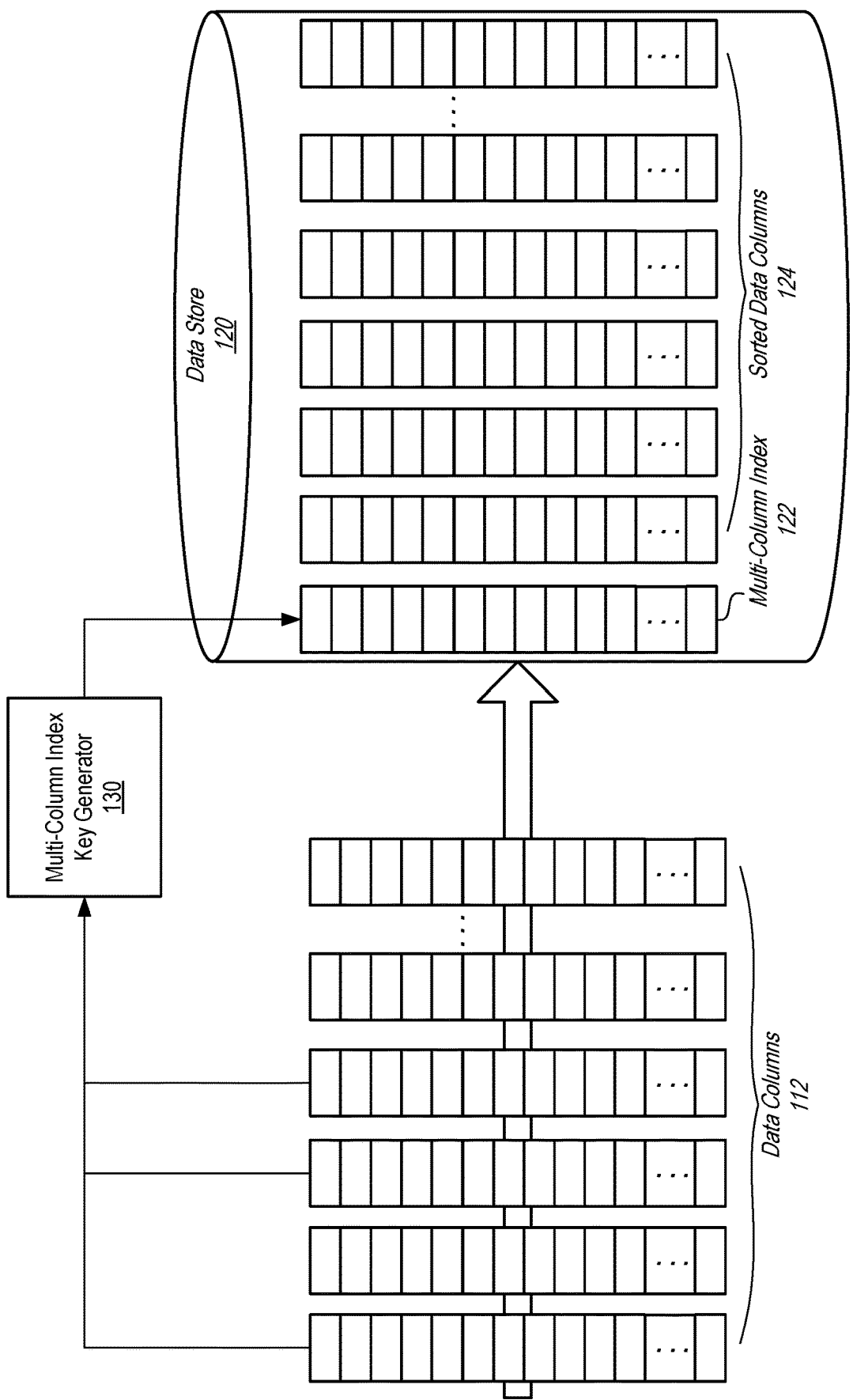
FIG. 1 illustrates a dataflow block diagram of multi-column indexing for a relational database system interleaving data bits for selectivity, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Various embodiments of generating a multi-column index for a relational database table interleaving data bits for selectivity are described herein. A database management service, such as a distributed data warehouse system, or other database management system may implement relational database tables according to many different formats, such as row-oriented formats and/or column-oriented formats (hereinafter referred to as "columnar database tables") in order to provide efficient data management for clients.

Typically, data in the relational database table is sorted according to one column of the database table, such as by date. When determining whether or not blocks sorting data for the column along which the data is sorted, different ranges for each data block may be stored or estimated, allowing for queries to only direct the reading of data blocks with the requested data known to be likely stored in the data block. However, such a technique may only be applied when responding to queries for data in the column along which the relational database table is sorted, as the database table may be only sorted using one column at a time. If a query is directed toward multiple different columns, then sorting along the single column may not provide the same efficient query processing properties. A common solution for typical database systems is to provide multiple copies of a database table sorted using different columns, consuming more resources. In another common solution, other database systems may sort the database table along a new column that holds a concatenated sort key, combining the values of the multiple columns over which the column is to be search in a single column value for each entry. However, such a solution may still bias efficient searching toward the order in which values are concatenated. Moreover, a concatenated key in this manner may not be equally selective across the multiple columns used for the index.

A multi-column index may allow a relational database table to be sorted or organized (e.g., distributed) using multiple columns from the relational database table. A multi-column index generated based, at least in part, on an interleaving technique that interleaves data bits for selectivity from the data values stored in entries for the multiple columns may provide an index value with more evenly distributed selectivity (e.g., discrimination or probability of a data value in a particular column) among the columns that make up the multi-column index. Thus, when processing queries directed toward indexing columns and/or columns used to generate the multi-column index (e.g., columns that are used to determine a data hierarchy for one of the indexing columns), the balanced or more evenly distributed selectivity of the multi-column index among the indexing columns may be used to search for select data more efficiently. For example, maintaining multi-column index value ranges (such as discussed in the above example) may allow for it to be determined which data blocks do and do not need to be read when servicing a query. Less read operations (or other various access operations) may, for example, then be executed to obtain data to service a received query. By generating a multi-column index based, at least in part, on interleaving data bits for selectivity in order to process queries for a relational database, some embodiments may provide more efficient management of and access to large amounts of data.

FIG. 1 illustrates a dataflow block diagram of generating a multi-column index for a relational database system based on interleaving data bits for selectivity, according to some embodiments. In various embodiments, data may be received for storage (or is already currently stored) for a relational database. Of multiple data columns 112 to be stored for a database table, different select ones may be used to generate a multiple-column index key, as illustrated by the arrow from some (but not others) of the data columns 112 directed toward multi-column index key generator 130. Selecting or identifying the columns to be used for generating the multi-column index key values may be performed as part of a table creation process, such as by receiving client-specified column identifiers for the columns to be used.

In some embodiments, multiple-column index key generator 130 may be implemented by a database system or other data store management component to generate a new column of data for a database table that includes a multi-column index key (or value). This multi-column index 122 may be generated based, at least in part, on interleaving data bits for selectivity from the identified columns used for generating the multi-column index. For example, an interleaving technique or scheme to generate a z-order curve, or other space-filling curve (e.g., a Hilbert curve), may be used to interleaving data bits from different column values according to their selectivity. For example, in a z-order curve, the most significant data bit from each column value is interleaved, and then the next most significant, and so on. Many different various of this technique, as well as other techniques, are discussed in further detail below with regard to FIG. 7. A multi-column index value may be generated for each entry in the database table according to an interleaving technique or scheme, by interleaving data bits from the value for each column of the entry. The resulting index-value may then be stored as a multi-column index key for the entry in the multi-column index 122. Various different methods and techniques may be used to generate an index value for multi-column index 122, and are discussed in greater detail below with regard to FIG. 7, as well as the various means for implementing a multi-column index key generator 130, as discussed with regard to FIGS. 5 and 6. In some embodiments an order-preserving compression technique may be applied to a value for a particular column prior to interleaving data bits from that value. Applying an order-preserving compression technique may better distribute selectivity among the individual data bits representing the value of the column for the entry. In at least some embodiments, a hierarchy or classification may be applied to a column prior to compression in order to provide an ordering for a column with less natural ordering, improving the selectivity of the compressed data.

Data store 120 may, in various embodiments, be persistent storage for a database system, such as a row-oriented or columnar storage system. Data columns 112 along with multi-column index key values generated by multi-column index key generator 130 may persisted in data store 120 for the database. In at least some embodiments, data columns may be stored in a sorted order according to multi-column index 112, and may thus be persisted as sorted data columns 124. These sorted data columns 124 and multi-column index 112 may be physically persisted in according to the sorted order of the multi-column index key values. When processing queries directed toward the database table, entries with similar multi-column index key values may be located close together, reducing the number of access requests and other related operations to service queries.

It is not uncommon for clients (or customers, organizations, entities, etc.) to collect large amounts of data which may require subsequent storage or management. Although some clients may wish to implement their own data management system for this data, it is increasingly apparent that obtaining data management services may prove a more efficient and cost effective option for those clients who do not wish to manage their own data. For example, a small business may wish to maintain sales records and related data for future data analysis. Instead of investing directly in the data management system to maintain the data, and the expertise required to set up and maintain the system, the small business may alternatively find it more efficient to contract with a data management service to store and manage their data.

Figure 2:
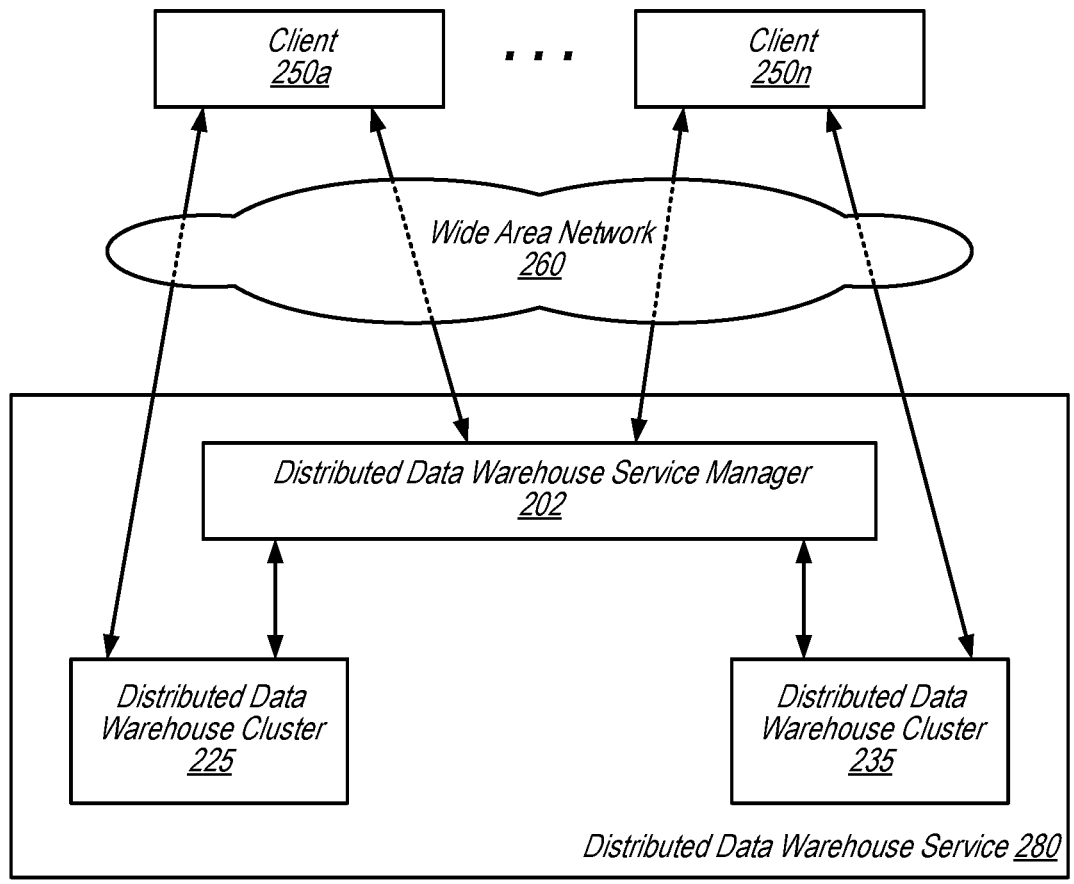
FIG. 2 is a block diagram illustrating an example distributed database warehouse service, according to some embodiments.

A data management service, such as a distributed data warehouse service discussed below with regard to FIGS. 2 through 4, may offer clients a variety of different data management services, according to their various needs. In some cases, clients may wish to store and maintain large amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as related to generating a multi-column index for a relational database system by interleaving data bits for selectivity may be equally configured or adapted to implement embodiments for various other types of relational database systems, such as row-oriented database systems. Therefore, the following examples are not intended to be limiting as to various other types or formats of relational database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data). For example, for database operations that only need to access and/or operate on one or a small number of columns at a time, less memory space may be required than with traditional row-based storage, since only data blocks storing data in the particular columns that are actually needed to execute a query may be retrieved and stored in memory. To increase the efficiency of implementing a columnar relational database table, a multi-column index may be generated to indicate the data values likely stored in data blocks storing data for the indexing columns of a columnar relational database table, which may be used to determine data blocks that do not need to be read when responding to a query.

As discussed above, various clients (or customers, organizations, entities, or users) may wish to store and manage data using a data management service. FIG. 2 illustrates an example distributed data warehouse system that may provide data management services to clients, according to some embodiments. Specifically, distributed data warehouse clusters may respond to store requests (e.g., to write data into storage) or queries for data (e.g., such as a Server Query Language request (SQL) for select data), along with many other data management or storage services.

Multiple users or clients may access a distributed data warehouse cluster to obtain data warehouse services. Clients which may include users, client applications, and/or data warehouse service subscribers), according to some embodiments. In this example, each of the clients 250a through 250n is able to access distributed data warehouse cluster 225 and 235 respectively in the distributed data warehouse service 280. Distributed data warehouse cluster 225 and 235 may include two or more nodes on which data may be stored on behalf of the clients 250a through 250n who have access to those clusters.

A client, such as clients 250a through 250n, may communicate with a data warehouse cluster 225 or 235 via a desktop computer, laptop computer, tablet computer, personal digital assistant, mobile device, server, or any other computing system or other device, such as computer system 1000 described below with regard to FIG. 10, configured to send requests to the distributed data warehouse clusters 225 and 235, and/or receive responses from the distributed data warehouse clusters 225 and 235. Requests, for example may be formatted as a message that includes parameters and/or data associated with a particular function or service offered by a data warehouse cluster. Such a message may be formatted according to a particular markup language such as Extensible Markup Language (XML), and/or may be encapsulated using a protocol such as Simple Object Access Protocol (SOAP). Application programmer interfaces (APIs) may be implemented to provide standardized message formats for clients, such as for when clients are communicating with distributed data warehouse service manager 202.

Clients 250a through 250n may communicate with distributed data warehouse clusters 225 and 235, hosted by distributed data warehouse service 280 using a variety of different communication methods, such as over Wide Area Network (WAN) 260 (e.g., the Internet). Private networks, intranets, and other forms of communication networks may also facilitate communication between clients and distributed data warehouse clusters. A client may assemble a message including a request and convey the message to a network endpoint (e.g., a Uniform Resource Locator (URL)) corresponding to the data warehouse cluster). For example, a client 250a may communicate via a desktop computer running a local software application, such as a web-client, that is configured to send hypertext transfer protocol (HTTP) requests to distributed data warehouse cluster 225 over WAN 260. Responses or other data sent to clients may be formatted in similar ways.

In at least some embodiments, a distributed data warehouse service, as indicated at 280, may host distributed data warehouse clusters, such as clusters 225 and 235. The distributed data warehouse service 280 may provide network endpoints to the clients 250a to 250n of the clusters which allow the clients 250a through 250n to send requests and other messages directly to a particular cluster. As noted above, network endpoints, for example may be a particular network address, such as a URL, which points to a particular cluster. For example, client 250a may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Distributed data warehouse clusters, such as data warehouse cluster 225 and 235, may be made up of one or more nodes. These clusters may include different numbers of nodes. A node may be a server, desktop computer, laptop, or, more generally any other computing device, such as those described below with regard to computer system 1000 in FIG. 10. In some embodiments, the number of nodes in a data warehouse cluster may be modified, such as by a cluster scaling request. Nodes of a data warehouse cluster may implement one or more data slices for storing data. These data slices may be part of storage devices, such as the disk storage devices discussed below with regard to FIGS. 3 and 4. Clusters may be configured to receive requests and other communications over WAN 260 from clients, such as clients 250a through 250n. A cluster may be configured to receive requests from multiple clients via the network endpoint of the cluster.

In some embodiments, distributed data warehouse service 280 may be implemented as part of a network-based service that allows users to set up, operate, and scale a data warehouse in a cloud computing environment. The data warehouse clusters hosted by the network-based service may provide an enterprise-class database query and management system that allows users to scale the clusters, such as by sending a cluster scaling request to a cluster control interface implemented by the network-based service. Scaling clusters may allow users of the network-based service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently.

In various embodiments, distributed data warehouse service 280 may provide clients (e.g., subscribers to the data warehouse service provided by the distributed data warehouse system) with data storage and management resources that may be created, configured, managed, scaled, and terminated in response to requests from the storage client. For example, in some embodiments, distributed data warehouse service 280 may provide clients of the system with distributed data warehouse clusters composed of virtual compute nodes. These virtual compute nodes may be nodes implemented by virtual machines, such as hardware virtual machines, or other forms of software implemented to simulate hardware configurations. Virtual nodes may be configured to perform the same tasks, functions, and/or services as nodes implemented on physical hardware.

Distributed data warehouse service 280 may be implemented by a large collection of computing devices, such as customized or off-the-shelf computing systems, servers, or any other combination of computing systems or devices, such as the various types of devices described below with regard to FIG. 10. Different subsets of these computing devices may be controlled by distributed data warehouse service manager 202. Distributed data warehouse service manager 202, for example, may provide a cluster control interface to clients, such as clients 250a through 250n, or any other clients or users who wish to interact with the data warehouse clusters managed by the distributed data warehouse manager 202, which in this example illustration would be distributed data warehouse clusters 225 and 235. For example, distributed data warehouse service manager 202 may generate one or more graphical user interfaces (GUIs) for storage clients, which may then be utilized to select various control functions offered by the control interface for the distributed data warehouse clusters hosted in the distributed data warehouse service 280.

Figure 3:
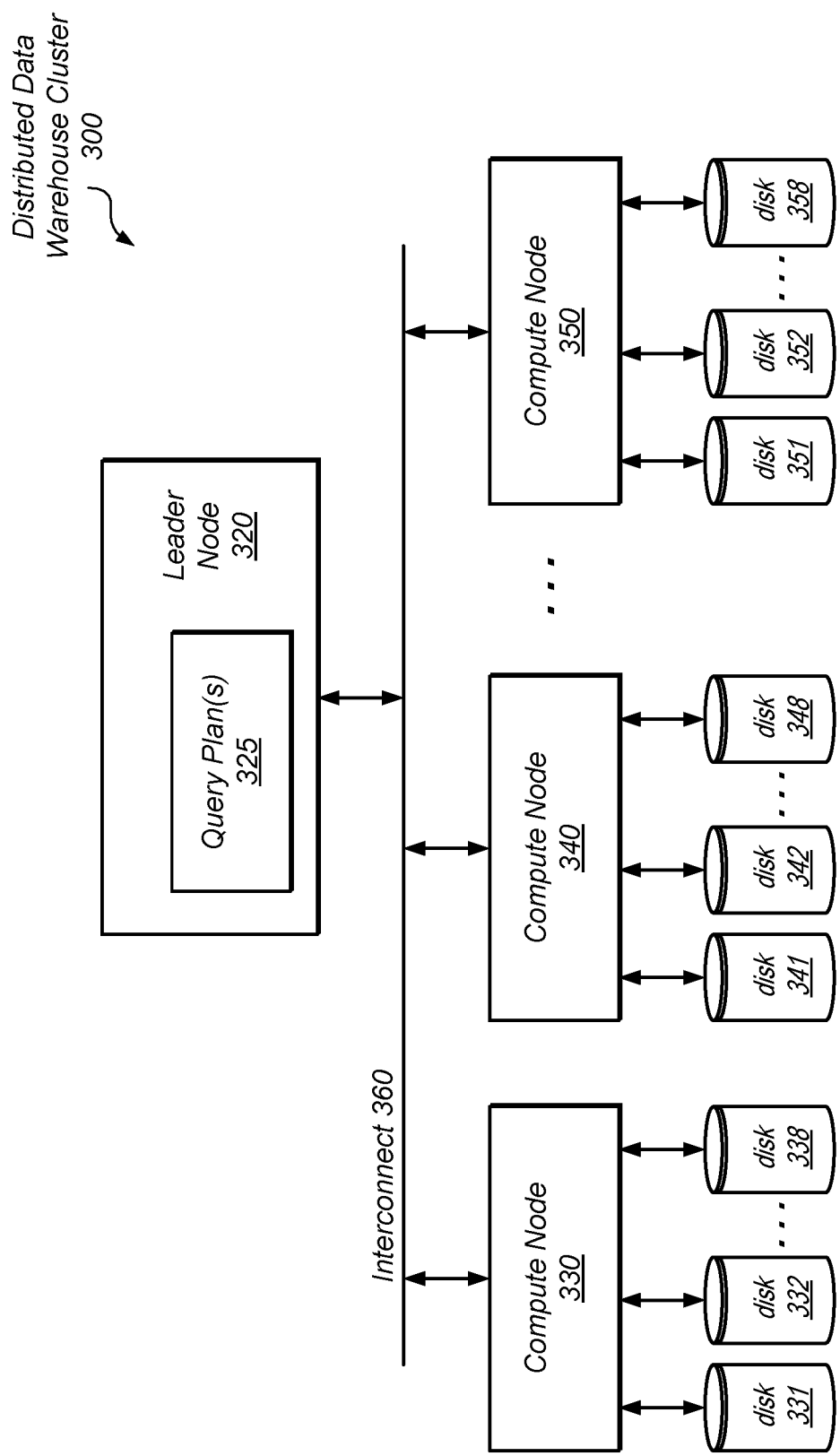
FIG. 3 is a block diagram illustrating an example distributed data warehouse cluster, according to some embodiments.

FIG. 3 is a block diagram illustrating a distributed data warehouse cluster in a distributed data warehouse service, according to one embodiment. As illustrated in this example, a distributed data warehouse cluster 300 may include a leader node 320 and compute nodes 330, 340, and 350, which may communicate with each other over an interconnect 360. Leader node 320 may generate and/or maintain one or more query plans 325 for executing queries on distributed data warehouse cluster 300. As described herein, each node in a distributed data warehouse cluster may include multiple disks on which data blocks may be stored on behalf of clients (e.g., users, client applications, and/or distributed data warehouse service subscribers). In this example, compute node 330 includes disks 331-338, compute node 340 includes disks 341-348, and compute node 350 includes disks 351-358. In some embodiments, a component of the distributed data warehouse cluster (or the distributed data warehouse system of which it is a component) may support load balancing, using any of a variety of applicable load balancing techniques. For example, in some embodiments, leader node 320 may include a load balancing component (not shown).

In at least some embodiments, distributed data warehouse cluster 300 may be implemented as part of the web based data warehousing service, such as the one described above, and includes a leader node 320 and multiple compute nodes, such as compute nodes 330, 340, and 350. The leader node 320 may manage communications with storage clients, such as clients 250a through 250n discussed above with regard to FIG. 2. For example, a leader node may be a server that receives requests from various client programs (e.g., applications) and/or subscribers (users), then parses them and develops an execution plan (e.g., query plan(s) 325) to carry out the associated database operation(s). More specifically, the leader node may develop the series of steps necessary to obtain results for complex queries and joins. Leader node 320 may also manage the communications among compute nodes 330 through 350 instructed to carry out database operations for data stored in the distributed data warehousing cluster 300. For example, compiled code may be distributed by leader node 320 to various ones of the compute nodes 330 to 350 to carry out the steps needed to perform queries, and intermediate results of those queries may be sent back to the leader node 320. Leader node 320 may receive data and query responses or results from compute nodes 330, 340, and 350. A database schema and/or other metadata information for the data stored among the compute nodes, such as the data tables stored in the cluster, may be managed and stored by leader node 320.

Distributed data warehousing cluster 300 may also include compute nodes, such as compute nodes 330, 340, and 350. These one or more compute nodes (sometimes referred to as storage nodes), may for example, be implemented on servers or other computing devices, such as those described below with regard to computer system 1000 in FIG. 10, and each may include individual query processing "slices" defined, for example, for each core of a server's multi-core processor. Compute nodes may perform processing of database operations, such as queries, based on instructions sent to compute nodes 330, 340, and 350 from leader node 320. The instructions may, for example, be compiled code from execution plan segments and steps that are executable by the particular data compute node to which it is sent. Data compute nodes may send intermediate results from queries back to leader node 320 for final aggregation. Each data compute node may be configured to access a certain memory and disk space in order to process a portion of the workload for a query (or other database operation) that is sent to one or more of the compute nodes 330, 340 or 350. Thus, compute node 330, for example, may access disk 431, 432, up until disk 438.

Disks, such as the disks 331 through 358 illustrated in FIG. 3, may be may be implemented as one or more of any type of storage devices and/or storage system suitable for storing data accessible to the data compute nodes, including, but not limited to: redundant array of inexpensive disks (RAID) devices, disk drives or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store columnar database tables through various column-oriented database schemes.

In some embodiments, each of the compute nodes in a distributed data warehouse cluster may implement a set of processes running on the node server's (or other computing device's) operating system that manage communication with the leader node, e.g., to receive commands, send back data, and route compiled code to individual query processes (e.g., for each core or slice on the node) in order to execute a given query. In some embodiments, each of compute nodes includes metadata for the blocks stored on the node. In at least some embodiments this block metadata may be aggregated together into a superblock data structure, which is a data structure (e.g., an array of data) whose entries store information (e.g., metadata about each of the data blocks stored on that node (i.e., one entry per data block). In some embodiments, each entry of the superblock data structure includes a unique ID for a respective block, and that unique ID may be used to perform various operations associated with data block. For example, indications of column-specific compression techniques applied to the data stored in the data block, indications of default compression techniques applied to the data stored in the data block, or probabilistic data structures that indicate data values not stored in a data block may all be stored in the respective entry for a data block. In some embodiments, the unique ID may be generated (and a corresponding entry in the superblock created) by the leader node or by a computing node when the data block is first written in the distributed data warehouse system. In at least some embodiments, an entry in the superblock may be maintained that indicates the range, such as the min and max values, for multi-column index values associated with the data values for entries stored in the superblock.

Figure 4:
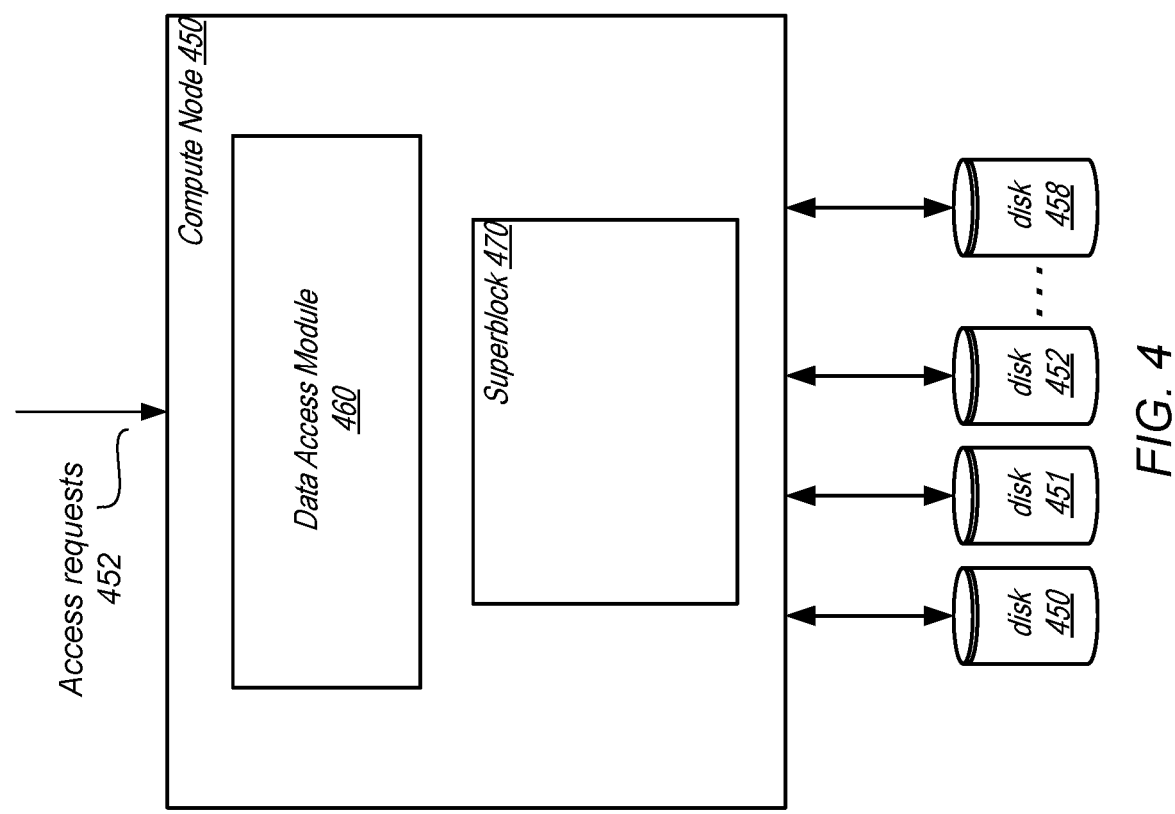
FIG. 4 is a block diagram illustrating an example compute node, according to some embodiments.

FIG. 4 illustrates an example of a compute node, according to some embodiments. Access requests 452, such as the various queries and messages sent to a leader node, such as leader node 320, and sent from a leader node to a compute node, may be received at compute node 450. A data access module 460, such as described in further detail below with regard to FIG. 5, may process access requests, directing reads, writes, and other access operations to disks 450 through 458. Various different hardware and software devices may be used singly or in combination to implement query execution module 460. When processing queries, data access module 460 may examine the entries of for the ranges of multi-column index values in the super block for each data block storing data for the database table to identify data blocks to be read in order to service the query, and then read the identified data blocks storing data for the column.

In some embodiments, a compute node 450 may also include a superblock data structure 470, such as the superblock data structure described above, stored locally at the compute node or stored remotely, but accessible to the compute node, which may include respective entries for the data blocks stored on the compute node 450 which store block metadata including multi-column index value ranges, as well as other information, for the data blocks. Note, however, that in some embodiments, metadata for data blocks may be stored in multiple different locations, such as in the data block itself, or in in other individual data structures. Therefore, the superblock data structure 470 is not intended to be limiting as to the various other structures, locations, methods, or techniques which might be applied to preserve metadata information for the data block.

Figure 5:
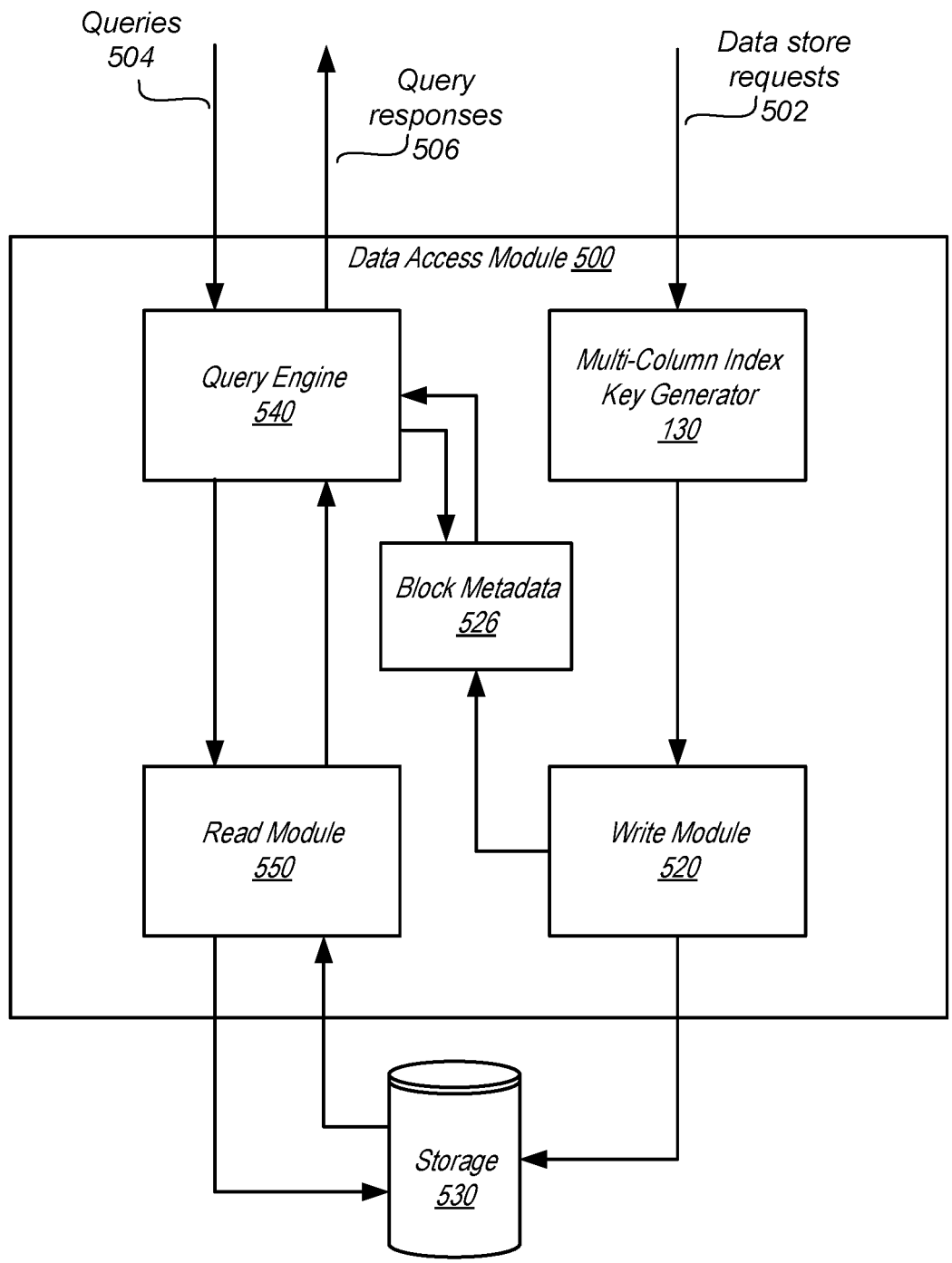
FIG. 5 is a block diagram illustrating an example data access module that implements generating and processing queries according to a multi-column index based on interleaving data bits for selectivity, according to some embodiments.

As discussed above, a compute node may be configured to receive access requests, such as queries, storage operations, and other data management operations. FIG. 5 is a block diagram illustrating an example data access module that implements bloom filters for query processing, according to some embodiments. Queries 504 and data store requests 502, or indications of queries or data store requests, may be received as inputs to data access module 500. Data access module 500 may communicate with storage 530, which may store a plurality of data blocks for multiple columns of a columnar database table. Data for the multiple columns may be stored in the data blocks in storage 530, and data access module 500 may be configured to both store this data and read this data from storage.

Portions or all of data access module 500 may be implemented on a compute node, such as compute node 450 described above with regard to FIG. 4. Although depicted in as implemented in a compute node in FIG. 4, data access module 500, or components or modules of data access module 500, such as multi-column key generator 130 may be implemented in leader node 320, described above with regard to FIG. 3, or some other component or module of the data warehouse service. Various different configurations of hardware and software components may be used to implement the data access module 500 as well as the components or modules illustrated within. Also note that, although different modules or components are illustrated within data access module 500 as one or more distinct modules or devices, these various components may be combined together, located differently, or alternatively configured to implement generating a multi-column index by interleaving data bits for selectivity in a columnar relational database table, and therefore, the following description of FIG. 5 is not intended to be limiting as to the various other ways a data access module or similar module or device may be implemented.

Data store requests 502 which may include data to be stored for a columnar relational database table stored in storage 530. For example, the data for storage in a data block in storage 530 may be obtain the data via an Open Database Connectivity (ODBC) and/or Java Database Connectivity (JDBC) driver interface or other component that is configured to receive storage request information and data for storage. Multi-column index key generator 130 may receive as input the data to be stored for the database table in storage 530. Although not illustrated, in at least some embodiments, data obtained from data blocks in storage may also be received as input at multi-column index key generator 130. For example, a multi-column index may be generated for an already stored or maintained columnar relational database table. Thus, the already stored data may also be received as input at the multi-column index key generator 130 in order to generate a multi-column index for the already stored columnar relational database table.

Figure 6:
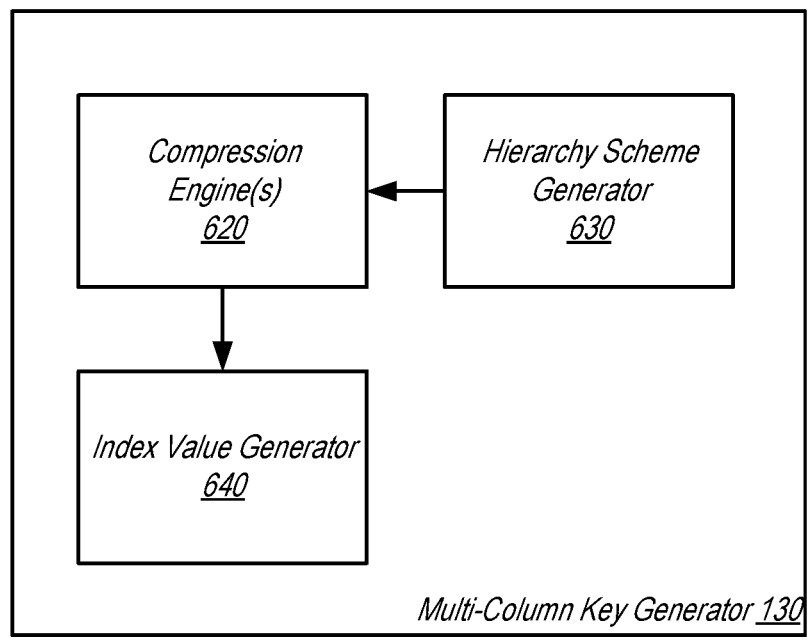
FIG. 6 is a block diagram illustrating an example multi-column index key generator, according to some embodiments.

Upon receipt of the data to be stored, multi-column index key generator 130 may generate a multi-column index for the columnar relational database table based, at least in part, on interleaving data bits for selectivity from columns identified for the multi-column index. Various techniques and methods for generating a multi-column index for a columnar relational database table are discussed below with regard to FIG. 7. FIG. 6 is a block diagram illustrating an example multi-column index key generator, according to some embodiments, that may implement one or more of the various techniques discussed below in FIG. 7. In at least some embodiments, multi-column index key generator 130 may implement one or more compression engines 620 which may be configured to compress data values for entries of one or more identified columns for the multi-column index. Compression engines 620 may be configured to perform or apply one or more order-preserving compression techniques. Generally, an order-preserving compression technique may compress data in such a way that the ordering of data elements compressed is preserved. In some embodiments, not all identified columns need to have data values compressed. For instance, in some embodiments, 3 columns may have been identified as to be used for generating a multi-column index, but only 1 column may be compressed.

In at least some embodiments, multi-column index key generator 130 may also implement a hierarchy scheme generator 630. Hierarchy scheme generator 130 may generate one or more different data structures, columns, tables, or other indicators that provide a hierarchy for a column that has little natural ordering. Date, for example, has a natural ordering (i.e. by time). A randomly generated number, such as a customer identifier, may have no natural ordering/classification. For example, a customer identifier number may not describe anything about the customer. Hierarchy scheme generator 130 may be configured to generate a hierarchy scheme to be applied to a column from one or more other columns of the columnar relational database table. For example hierarchy scheme generator 130 may provide a scheme that includes state of residence for the customer and postal code of the customer to compression engines 620, such that compression codes for customers are generated for the customer identifier column that is a hierarchy including the state of residency, then the postal code, and then customer identifier itself. This may be done, for instance, by applying bit patterns or codes that represent states and zip codes of the customer and concatenating them with the data bits that represent the customer identifier. This information may be obtained from a group-by column or dimension table for a column. In some embodiments, various hierarchy techniques, such as a snowflake or star scheme may be used to provide hierarchy or classification for the values for entries in a particular column.

By applying a hierarchy scheme to a column when generating the compressed data, the index values of similar values as defined by the hierarchy will be located closer together, resulting in a more efficient queries directed toward the groupings specified in the applied hierarchy scheme. For instance, continuing with the example given above with customer identifier, as compressed versions of customer identifier will include data bits or patterns of data bits that represent states and postal codes for customer identifiers in the data, when the data bits are interleaved by index value generator 640, with data bits from other columns, customer identifiers with similar or the same states of residency and/or postal codes may have similar z-values, and thus be located closer together, which may require less access operations to service queries directed toward customer identifiers of a particular state and/or postal code.

Multi-column index key generator 130 may also implement an index value generator 640. Index value generator 640 may implement the various techniques described below with regard to element 710 in FIG. 7. For instance, in some embodiments, index value generator 640, may interleave the data bits from the identified indexing columns in an entry of the database table in order of significance, such as taking the most significant bit first from each data block, then the next most significant (e.g., similar to performing a z-ordering interleaving technique), and so on, until the data bits from the columns have been place in the newly generated index value. The generated index value may be used as the multi-column index value (which may be a key value for the columnar relational database table, such as a sort key or distribution key). In some embodiments, multi-column index key generator 130 may receive as input additional data/entries to be stored in a columnar relational database table. Multi-column index key generator 130 may generate a multi-column index value for the additional entry. In some embodiments, additional data bits may be added for the additional data/entries, such as by compression engines 620, in order to maintain a balanced distribution of selectivity among the data bits from a particular column. For example, if a column has data values that include 14 and 16, and a new value 15 is added, then instead of re-compressing the entire data column, data bits may be added to the compressed version of 15 used for generating the index value that indicates it is between 14 and 16.

Multi-column index key value generator 130 may store, update, or send the multi-column index values generated for the columnar relational database table to write module 520 which may subsequently store the entries in storage 530. For additional entries received for an already existing table, write module 520 may direct storage 530 to store the entry in an unsorted region of storage 530. Block metadata 526 may be aggregated metadata for the blocks in storage 530, such as the superblock data structure 470 described above with regard to FIG. 4. Write module 520 may store multi-column index value ranges for data blocks as part of block metadata 526. Alternatively, in some embodiments, block metadata 526 may be distributed in different locations for different blocks, or stored in a location remote from, yet accessible to, the data access module.

A write module 520 may also be implemented by data access module 500 to store the data for data blocks in the data blocks in storage 530. In at least some embodiments, write module 520 may be configured to sort the entries of the columnar relational database table according to the multi-column index values for each respective entry and direct the storage 530 to store the columnar relational database table according the sorted order. In some embodiments, write module 520 (or another module or modules, such as the multi-column index key generator 130) may be configured to update block metadata 526 with other metadata for the data stored in the data block.

Data access module 500 may also receive queries 504, or indications of queries, such as queries for select data stored in storage 530. For example, a leader node, such as leader node 320 described above with regard to FIG. 3, may receive a query from a storage client, and generate a query execution plan which sends the query to a compute node implementing data access module 500. Data access module 500 may implement a query engine 540 to process and receive the queries. As discussed above queries may be instructions to be executed according to a query plan, but may also be more generally any type of request for data that meets a specified criterion or is generated by a specified process. In some embodiments, a query, or an indication of a query, may include one or more predicate data values that identify select data for processing the query. For example, an SQL query may include predicate data values that specify equality conditions to be met for data to be retrieved, such as "WHERE customer='small' AND customer='medium'." In some embodiments, there may different types of queries. Some types of queries may require filtering on point values (e.g., all records where the state value="Texas"). Other queries may request larger groups of data, such as range queries that filter data based on a range of data values (e.g., all purchase orders for with purchase prices between $1,000 and $10,000). Some queries may indicate data joins that join records from one table in database based on a corresponding value obtained from another database. (e.g., join the records from of a personal database that includes an indication of a particular work department with those records of employee personal information that include the same work department). As query engines 540 are well-known to those of ordinary skill in the art, the previous description is not intended to be limiting as to the many different techniques and implementations of a query engine. For example, a standard query engine configured to process standard database protocol messages, such as SQL requests, may be implemented, or alternatively, a query engine that processes customized queries, such as those specified by an API may be used.

Figure 8:
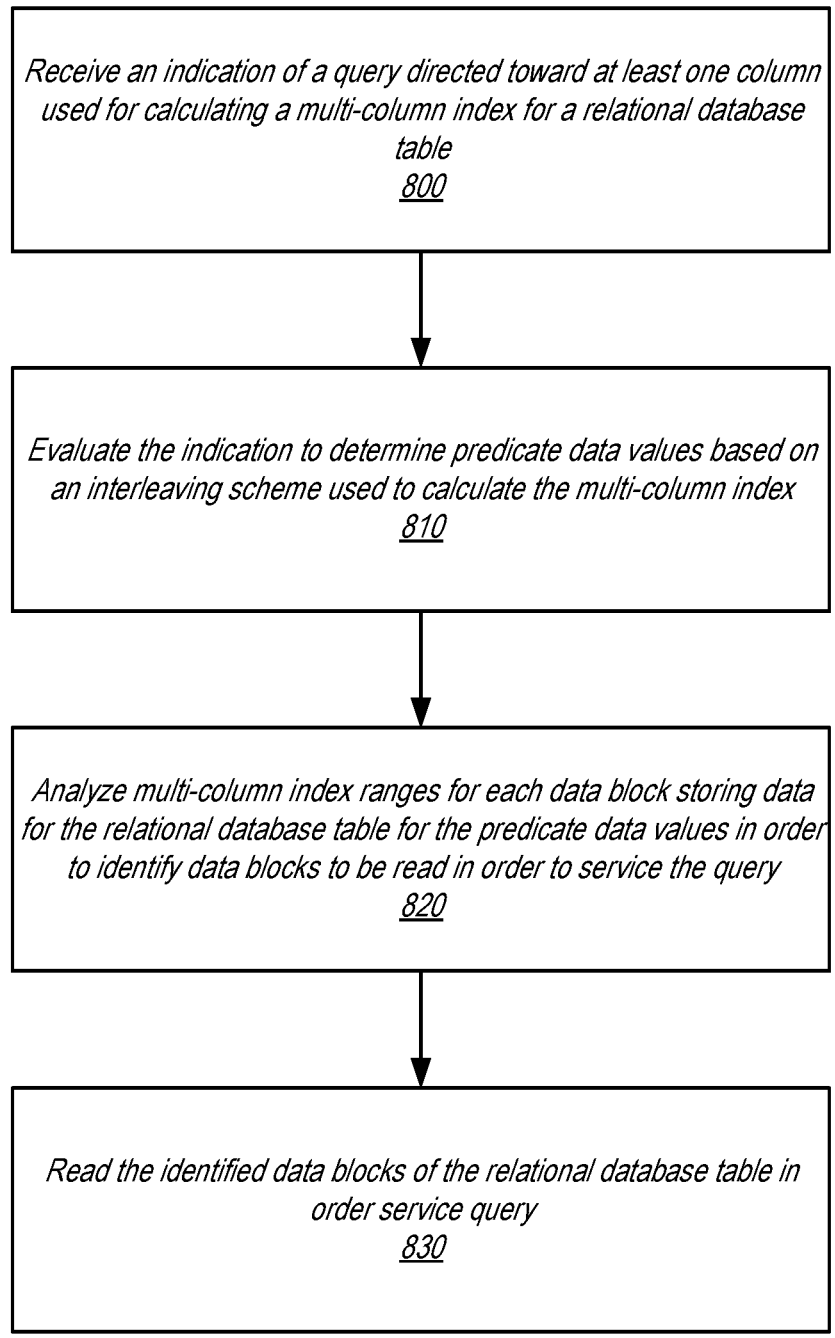
FIG. 8 illustrates a high-level flowchart of a method to process queries directed toward a relational database with a multi-column index based on interleaving data bits according to selectivity, according to some embodiments.

In some embodiments, therefore, a query engine 520 may receive an indication of a query 504 directed to one or more of the columns used to generate the multi-column index (including one or more columns used to determine a hierarchy scheme applied to one of the indexing columns) for the columnar relational database table in storage 530 for select data. Query engine 540 may evaluate the indication to determine one or more predicate data values based on the same interleaving technique that interleaves data bits for selectivity used to generate the multi-column index. For example, if a query is directed toward 3 columns, and indicates selected ranges or values for those three columns (e.g., date=last two months), then index values may be generated which create predicate index values to be utilized when performing determining which data blocks need to be read. For instance, one or more ranges of index values may be indicated as containing the select data. Multi-column index value ranges, such as might be stored in block metadata 526 may be evaluated to determine whether a particular data block stores data for entries associated with the predicate index values. If the range does not include then predicate index values, then data block need not be accessed. Thus, in some embodiments, index values may be used to identify data blocks to be ready when servicing the query. FIG. 8, discussed in further detail below, describes some of the various methods and techniques that may be used to process queries using multi-column index values, and therefore the above example is not intended to be limiting. Query engine 540 may then direct read module 550 to read the identified data blocks storing data for the columnar relational database table in order service the query.

In at least some embodiments, data access module 500 may include read module 550. Read module 550 may perform read operations to obtain data from storage 530. In some embodiments, read module 550 may be directed by query engine 540 to read certain data blocks for a column of the columnar relational database table and return the read data to query engine 540 for further processing. Query engine 540 may then provide at least some of the data in a query response 506 to a storage client, leader node, or other requesting system or device, or process, filter, manipulate, or otherwise change the data read from storage 530 in accordance with the received query. In at least some embodiments, read module 550 may also transfer data read from storage 530 to a database cache (not illustrated) or other module or device part that provides storage for more frequently accessed data when processing queries 504. Query engine 540 may then access the cache or other module with requesting new read operations of the read module 550. As a variety of different caching techniques for data management and storage systems are well-known to those of ordinary skill in the art, the previous examples are not intended to be limiting.

Figure 9:
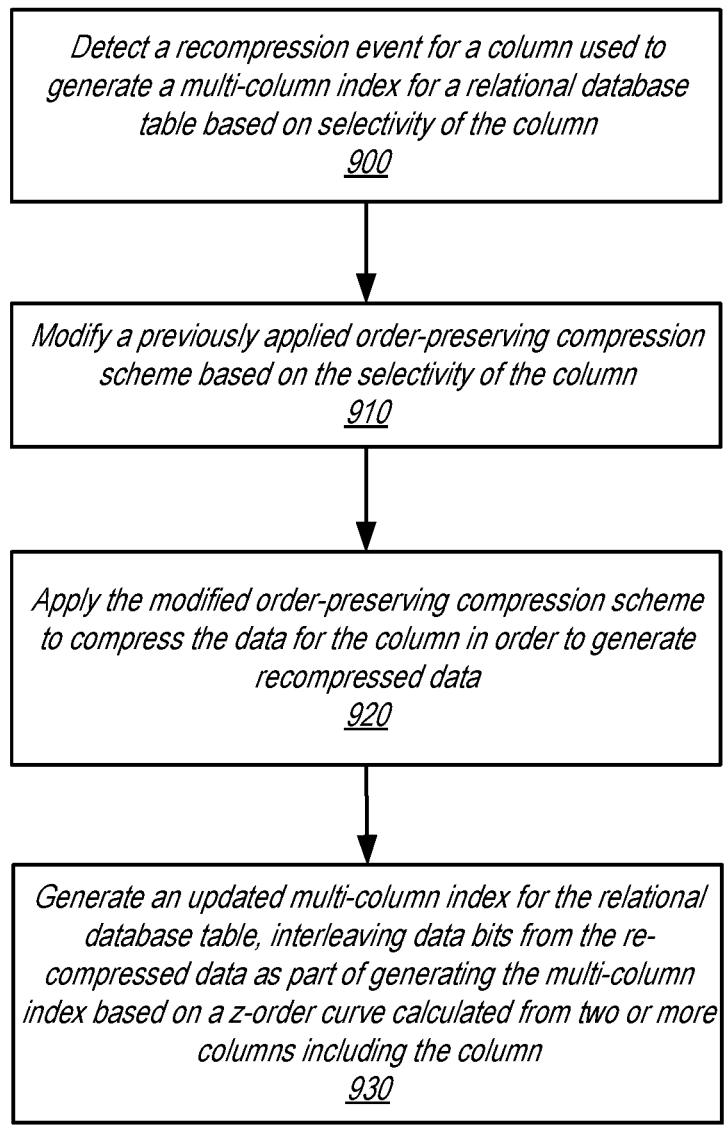
FIG. 9 illustrates a high-level flowchart of a method to regenerate a multi-column index for a relational database based on column data re-compressed according to a modified compression scheme, according to some embodiments.

Although not illustrated, one of the various components of data access module 500, such as query engine 540 or a multi-column index key generator 130, may be configured to detect a re-compression event for a column used in a multi-column index for a columnar relational database table. FIG. 9 illustrates various methods and techniques that may be implemented to regenerate a multi-column index for a relational database based on column data re-compressed according to a modified compression scheme. Multi-column index key generator 130, for instance, may be configured to regenerate the multi-column index for a columnar relational database table upon the detection of a re-compression event, by applying a modified compression scheme to data of a particular column, and interleaving the re-compressed data bits with data bits from other columns to generate new multi-column index values.

In various embodiments, if an updated multi-column index is generated, whether as a result of a recompression event, or some other event, the current multi-column index may be maintained in order to service queries directed to the columnar relational database during the generation of the updated multi-column index. Upon completion of the updated multi-column index, queries may then be serviced using the updated multi-column index.

Although FIGS. 2 through 6 have been described and illustrated in the context of a distributed data warehousing system implementing a columnar relational database table, the various components illustrated and described in FIGS. 2 through 5 may be easily applied to other data management systems that provide data management and/or storage services for a relational database table, which may include various other data formats, such as a row-oriented relational database. As such, FIGS. 2 through 5 are not intended to be limited embodiments in a distributed data warehouse cluster, nor limiting a description of a data storage and management cluster. For instance, various embodiments of row-oriented database systems may also implement similar modules or components in order to generate a multi-column index by interleaving data bits for selectivity.

Figure 7:
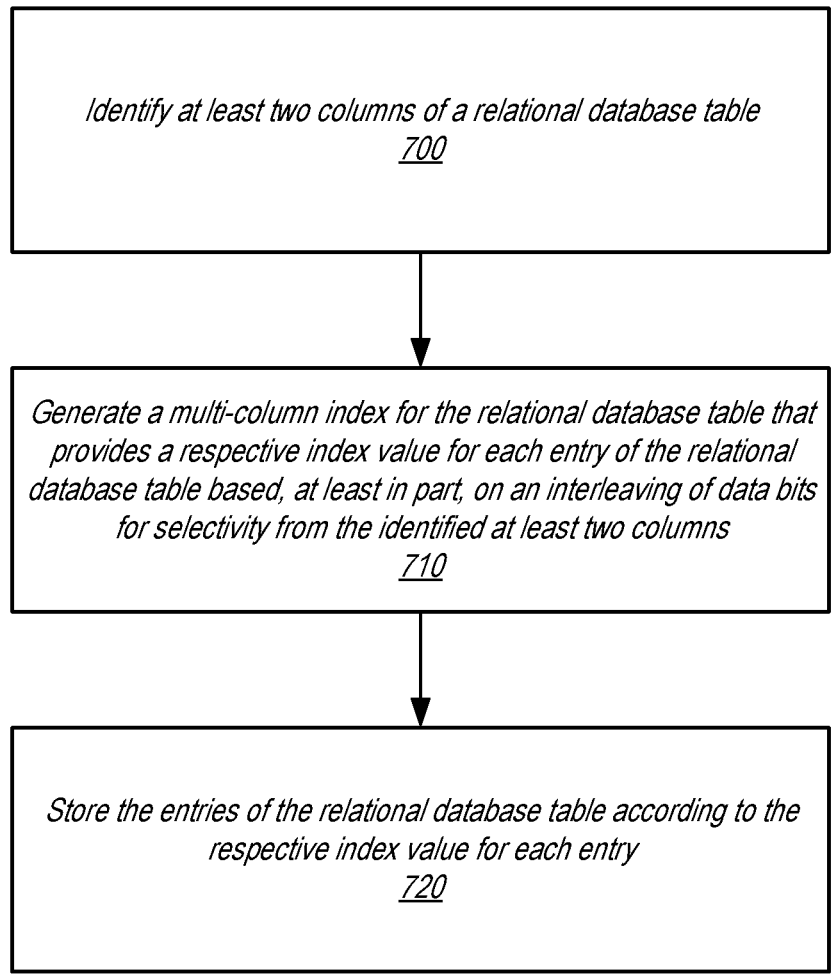
FIG. 7 is a high-level flowchart illustrating a method to generate a multi-column index for a relational database table based on interleaving data bits for selectivity, according to some embodiments.

As has been discussed above, database management systems may be configured to utilize relational database tables to provide more efficient data management functions. In order to more efficiently perform these functions, a multi-column index based, at least in part, on interleaving data bits for selectivity may be implemented for a relational database table. FIG. 7 is a high-level flowchart illustrating a method to generate a multi-column index for a relational database table based on interleaving data bits for selectivity, according to some embodiments. Various different systems and devices may implement the various methods and techniques described below, either singly or working together. For example, a data access module implementing a multi-column index key generator, such as multi-column index key generator 130 described above with regard to FIGS. 5 and 6, and a query engine, such as query engine 540, to implement the various methods. Alternatively, a combination of different systems and devices, such as the multiple compute nodes illustrated in FIG. 3 working together, for example, may also perform the below method and techniques, as well as a leader node 320, also illustrated in FIG. 3. Therefore, the above examples and or any other systems or devices referenced as performing the illustrated method, are not intended to be limiting as to other different components, modules, systems, or configurations of systems and devices.

As indicated at 700, in various embodiments at least two columns of a relational database table may be identified. Identification of database columns may be determined in response to receiving a client or other request selecting columns to include in a multi-column index, in some embodiments. For example, a client, such as client 250 described above in FIG. 2, may send column identifiers as part of a larger create table request or as part of filling in a form other interface that generates a create table request that is processed at a data warehouse service. Various embodiments may also perform various selectivity analysis on data to be stored (or already stored) for a column, such as how many unique data values are stored in a given column (e.g., gender=2 unique values, postal codes=99999 values), in order to determine two or more columns that may be utilized for a multi-column index. For example, a grouping of 3 columns may be identified as below a certain level of selectivity, and thus selected to be grouped as part of the multi-column index. Some embodiments may analyze or evaluate metadata or other query or access statistics for a database to determine those columns whose entries are most often searched for. Consider the scenario where a relational database system maintains statistics for the number of times a particular column is used for the predicate values of a query and that the 3 most frequently used columns are then identified to be used as part of a multi-column index. Thus, if a new relational database table is to be created that includes the same (or similar) 3 most frequently accessed columns, then those columns may be used to generate the multi-column index for the new database table.

Once the at least two columns of relational database table are identified, in various embodiments a multi-column index for the relational database table may be generated, as indicated at 710. As previously noted, a multi-column index for a relational database table may provide an index value for each entry (i.e. row) of the database table. Thus, in various embodiments, a new column is generated for the database table that contains these respective multi-column index keys or values. Also as noted above, the multi-column index may be generated based, at least in part, on interleaving data bits for selectivity from the identified columns to generate index values as the multi-column index key or value. In various embodiments, these index values may provide more selectivity for performing various query operations with respect to the identified columns than the individual columns may provide when considered alone.

The generation of index values according to interleaving techniques for selectivity may be performed in different ways according to various embodiments. Index values may be generated by interleaving binary data values from selected data to generate a new index value. With respect to generating an index value for an entry (i.e. row) of a relational database table, data bits of the columns identified at 700 may be interleaved to create a new index value for that particular entry. In some embodiments, data bits are interleaved in the order of their significance (e.g., such as using a technique to generate a z-order curve). For example, if the identified columns for a relational database table are column A and column E, and the value of the entry for column A is 6 (binary value=110) and for column B is 3 (binary value=011), then the bits for the entry of column A and column B may be interleaved according to the most significant bit (i.e. the first bit value). In this example, the first bit from column A's value is 1, after which is added the most significant bit value of B, which is 0, then A's next most significant value 1 is added, then B's next most significant bit is added 1, etc. . . . The final created index value in this example is 1_0_11_0_1 (the under lined values represent the bits interleaved from column B). Similar techniques may be applied to greater numbers of selected columns. For instance if 5 columns are identified, then the bits may be interleaved from each of the 5 columns, with the same pattern repeating for each next bit in the value for the entry in the identified column. Along with varying numbers of identified columns, various embodiments may also use different selection patterns from which to interleave data bits. Although in the example given above, column A's value is interleaved before column B's value, the reverse pattern B then A may also be used. Similarly for generating index values from larger numbers of identified columns, larger variations in the selection pattern may be employed (e.g., col. 1, then col. 6, then col. 2, and then col. 23). In at least some embodiments, the same pattern is repeated when interleaving data bits from the identified columns. Moreover, as many different interleaving techniques (e.g., such as space filling curve techniques) are well-known to those of ordinary skill in the art, the previous examples are not intended to be limiting as to various other ways in which a multi-column index may be generated for identified columns of a relational database table.

In various embodiments, the data stored for each entry in a column may not be evenly distributed or selective across all data bit values for the entry. For example, if a column describes gender the data bit patterns may only be two different patterns, such as the ascii values for M (0100 1101) or F (0100 0110). The first four bits of each value are the same. Interleaving those bits may not generate an as efficiently selective index value as from interleaving bits from different columns that are more evenly (or equally) selective. In at least some embodiments, different numbers of bits may be selected when interleaving data bits in order to provide a more even distribution of selectivity across each index value. Thus, if the gender value ascii codes are used above, then the first 5 bits may be added as a group before interleaving other values. Different numbers of bits may be interleaved from each column, in some embodiments. Alternatively, in other embodiments, the same number of data bits may be interleaved, as in the example given above.

In at least some embodiments, an order-preserving compression technique may be applied to data for one or more of the identified columns as part of generating index values for the multi-column index. Typical order-preserving compression techniques, such as dictionary-based compression techniques, may reduce repetitive or unselective portions of data values, such as by replacing these portions with more selective data values, while maintaining the original ordering of data elements. For example, if a given column for shipping type contains various different phrases, such as "next day, 2-day, overnight, ground, air" then a dictionary compression technique may be used to replace common combinations of characters with a smaller bit pattern representing that combination of characters. Thus, in this example, "day" may be replaced with a smaller number of data bits to represent "day". As various different order preserving compression techniques are well-known to those of ordinary skill in the art, the previous example is not intended to be limiting as to the various different types, methods, or techniques for applying an order-preserving compression technique. Data bits from the compressed data for an entry of a column may then be interleaved with data bits from other identified columns in order to generate an index value for the multi-column index. In at least some embodiments, the same compression technique may be applied to data values in a particular column. As a result of applying order-preserving compression techniques, data bits may be more evenly selective for column, providing a more selective z-value for the multi-column index. In some embodiments, when generating an index value for additional entries, data bits may be added to a data value for a column in order to preserve the balance of selectivity across the indexing columns.

While some types of data stored in a column may have a natural ordering or classification between data values of the column (e.g., sales dates may be naturally ordered in time), other types of data may not have a natural ordering or structure of data values. For example, product identifiers or customer identifier columns may not have a natural ordering or structure, but may instead be randomly generated or assigned characters grouped together. For those columns identified as part of a multi-column index for a relational database table, a hierarchy may be identified, determined, and applied, in order to provide a natural ordering or classification for data values in the column. Thus, when searching for a customer identifiers associated with a particular age and location, for instance, the hierarchy applied to the customer identifiers may have allowed for similar customer identifiers (as defined by the applied hierarchy scheme) to be located close together by their similar index values used for the multi-column index. Thus, in some embodiments, a hierarchy or classification scheme may be determined for one or more columns prior to compressing the one or more columns.

As part of applying the hierarchy scheme, the various order preserving compression techniques used to compress a column's data may include data bits that would include in the compressed version of the column's data the hierarchy of the column. For example, a product identifier (which may have little or no natural ordering or classification as it may be a randomly generated number) may have a hierarchy scheme determined that includes the general family of product (e.g., home goods, electronics, clothing, food, etc. . . . ) and a more specific sub-class (e.g., for electronic items it might be televisions, audio players, video players, cameras, mobile phones, etc. . . . ) for each product identifier. When applying an order-preserving compression scheme to the product identifier column, compression codes for product identifiers may be are generated (in a dictionary-based compression technique) that include for the product identifier the family of product, then the sub-class of the product, and then product identifier itself. This may be done, for instance, by applying bit patterns or codes that represent families of products and sub-classes of the customer and concatenating them with the data bits that represent the customer identifier. Determining particular bit patterns or codes for hierarchies may be based on the number of unique values for each grouping. For example, if location, such as state and postal code is used, codes representing a state with few postal codes may be smaller than states with larger numbers of postal codes. Many other different ways of applying hierarchy schemes may be implemented, and thus previous examples are not intended to be limiting. In some embodiments, a snowflake or start scheme may be used to include additional dimension information that is used for a hierarchy about a particular column.

As indicated at 720, in various embodiments the entries of the relational database table may then be stored according to the respective index values for each entry in the relational database table. In at least some embodiments, the multi-column index value may be used as a sort key for the relational database table. When the entries are persistently stored on one or more storage devices, the entries may be sorted in order of their respective sort key (i.e. index value) and stored in the sorted order. Metadata describing the storage, such as superblock 470 described above with regard to FIG. 4, may indicate the respective index values for data stored in a particular data block (e.g., such as a range of index values). In at least some embodiments, the multi-column index value may be used as a distribution key for the relational database table. A distribution key may be used to determine the storage location of portions of the relational database table when stored in multiple different locations. For example, as described above in FIG. 3, multiple compute (or storage) nodes may be implemented to store data for a relational database table. The distribution key may be used to determine different portions of the relational database table which are to be located and then stored at different compute nodes according to the multi-column index value for each respective entry. For example, different ranges of multi-column index values, such as 1-2000, 2001-4000, and 4001-6000 may each be stored on different compute nodes. By implementing the multi-column index value as the distribution key, some embodiments may improve the performance of queries joining other relational database tables based on the identified columns used to generate the multi-column index.

The various methods and techniques discussed above with regard to FIG. 5 may be performed upon the occurrence of different events, triggers, or other requests. For example, in some embodiments a relational database table may already be stored or maintained, and a request may be received that indicates two or more columns to be used for generating a multi-column index based, at least in part, on interleaving data bits for selectivity, as illustrated above. In another example, data and/or entries may be received to be persisted for a database table in some embodiments (e.g., a new row for the database table). Upon receipt of the additional data/entries, one or more multi-column index values may be generated according to the same columns that have already been used to generate the multi-column index values for the relational database table to which the data/entries are to be added. In another example, a relational database system, such as a database system manager, module, or other management component may be configured to dynamically or automatically determine that a particular database table receives frequent queries directed toward two or more columns and perform a method or technique illustrated above to generate a multi-column index for a database table without a client request to do so.

Receiving additional data/entries may, as noted above, trigger the generation of multi-column index values for the new data/entries in the database table. In at least some embodiments, various updates (deletions, inserts, modifications, additions, etc. . . . ) to a relational database table may be stored as new entries in an unsorted region in storage. In response to detecting a resort event (e.g., a client request to reclaim freed up space or crossing some threshold of unsorted data persisted in an unsorted region), the relational database table may be resorted such that the new data/entries as a result of updates to the relational database table may also be stored in a sorted order (along with the previously sorted entries) according to the multi-column index values/keys that have been generated for the new data/entries.

Multi-column index values, in some embodiments, may be implemented in order to process queries directed toward one or more of the columns of a relational database table. By evaluating multi-column index values, queries may be processed or serviced more efficiently, such as by reducing the number of data blocks in a persistent storage device that need to be read. FIG. 8 illustrates a high-level flowchart of a method to process queries directed toward a relational database with a multi-column index based on interleaving data bits for selectivity, according to some embodiments.

As indicated at 800, an indication of a query directed toward at least one column used for calculating a multi-column index for a relational database table may be received, in various embodiments. For instance, if a customer identifier, product identifier, and sales date column are used to generate a multi-column index for a column, a query indication may be received that is searching for one or more customer identifier, product identifier, and/or sales date values. Note, that a query need not be directed to all of identified columns used to generate a multi-column index. Likewise, in some embodiments the query may also be directed to other columns in addition to those columns used in the multi-column index. For example, in some embodiments, queries may also be directed to (with or without the indexing columns) columns used to determine and/or apply a data hierarchy to an indexing column. Thus, continuing with the above example, a query may be directed toward customer identifier and product identifier, as well as customer age demographic and customer gender (which may be used to determine a hierarchy to be applied to customer identifier).

Upon receipt of the indication of the query, the indication may be evaluated to determine predicate data values for the query based on the same interleaving of data bits for selectivity used to generate the multi-column index for the relational database table, as indicated at 810. Similar to the discussion above of generating index values for the multi-column index, index values may be generated as predicate data values to be searched for with respect to the relational database table. For instance, values, ranges, or other data used to identify predicate data values may be used to generate one or more index values that are used for processing queries. In this example, if a range or list of customer identifiers may be indicated, then those data values may be interleaved with values representing the other columns used to generate a multi-column index in order to generate index values. Thus customer identifiers 100-200 may be translated into index values that are generated with data bits from 100-200. The values for other columns used to generate an index value may also be used if known. Otherwise, other values may be included, in some embodiments, to generate index values that are inclusive of all of the entries of those index columns.

In various embodiments, multi-column index ranges may then be analyzed or evaluated for each data block storing data for the relational database table for the predicate data values in order to identify data blocks to be read in order to service the query, as indicated at 820. For example, in some embodiments, metadata describing index values for data/entries stored in data blocks in persistent storage may be stored/maintained (e.g., metadata may describe the range of z-values, such as the min and max index value, of entries stored in particular data blocks). As noted above, the entries of the relational database table are stored, in some embodiments, sorted according to the index value for each entry, allowing for similar data entries (as determined by index value) to be located together in data blocks. Thus, when analyzing the multi-column index ranges, it may be determined that predicate data values may be stored in only one location, those data blocks that are indicated as containing the predicate data values within the range.

Identified data blocks of the relational database table may then be read in order to service the query, as indicated at 830. For example, identified data blocks may be a list of block addresses to be sent in access requests to persistent storage devices (or other systems that manage or access persistent storage devices) storing data for the relational database table.

Updates to a relational database table may trigger the creation of new entries for the relational database table, as mentioned above with regard to FIG. 7. In some embodiments, these new data/entries may alter the selectivity of a particular column. For instance, if a company maintains sales data for a company that primarily does business in California, and some small business in surrounding states, a compression scheme or selection of data bits when generating an index value may be based on distributing the selectivity of entries for California sales more evenly across the bits used in representing California sales. However, if the company subsequently expands heavily into another state, such as Oregon, generating more new sales data, the new entries may alter the selectivity distribution of bits representing the location column (as more entries may now also be needed to represent Oregon). If an order-preserving compression technique is applied, for instance, the technique may not adequately distribute the selectivity of Oregon sales as it may have been originally based on few Oregon sales. Therefore, in some embodiments, various methods and techniques may be implemented to accommodate the change in selectivity of data, such as for those embodiments where compression is used to evenly distribute selectivity of data bits in a column. FIG. 9 illustrates a high-level flowchart of a method to regenerate a multi-column index for a relational database based on column data re-compressed according to a modified compression scheme, according to some embodiments.

As indicated at 900, a re-compression event may be detected for a column used to generate a multi-column index for a relational database based, at least in part, on the selectivity of a column, in some embodiments. For example, in various embodiments metadata describing a compression technique/scheme used to distribute evenly data bits for a column of a relational database may be maintained, such as a dictionary data structure for a dictionary-based compression technique. When, for instance, a certain number of new data values for a column are received that cross some skew measurement threshold or other limit, then a re-compression event may be triggered for the column. Upon detecting the re-compression event, a previously applied order-preserving compression technique/scheme may be modified based on the selectivity of the column, as indicated in 910. In various embodiments, this may be simply adjusting a dictionary or other substitution-based compression encoder to include a smaller bit representation for a portion of a newly reoccurring data value. Alternatively, a different compression technique may be applied altogether (or the same compression technique re-applied which may re-analyze and self-modify).

As indicated at 920, the modified compression scheme may be applied to compress the data in the column in order to generate re-compressed data. This recompressed data may then be used as part of re-generating an updated multi-column index for the relational database table, interleaving data bits from the re-compressed data for selectivity from the identified columns, as indicated at 930. In at least some embodiments, the index values may be updated, without re-sorting or relocating the entries of the relational database table in storage. In at least some embodiments, the original multi-column index may be used to service access requests (e.g., read requests) at the relational database until the updated multi-column index has been completely generated.

Embodiments of generating a multi-column index for a relational database system by interleaving data bits for selectivity as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 10:
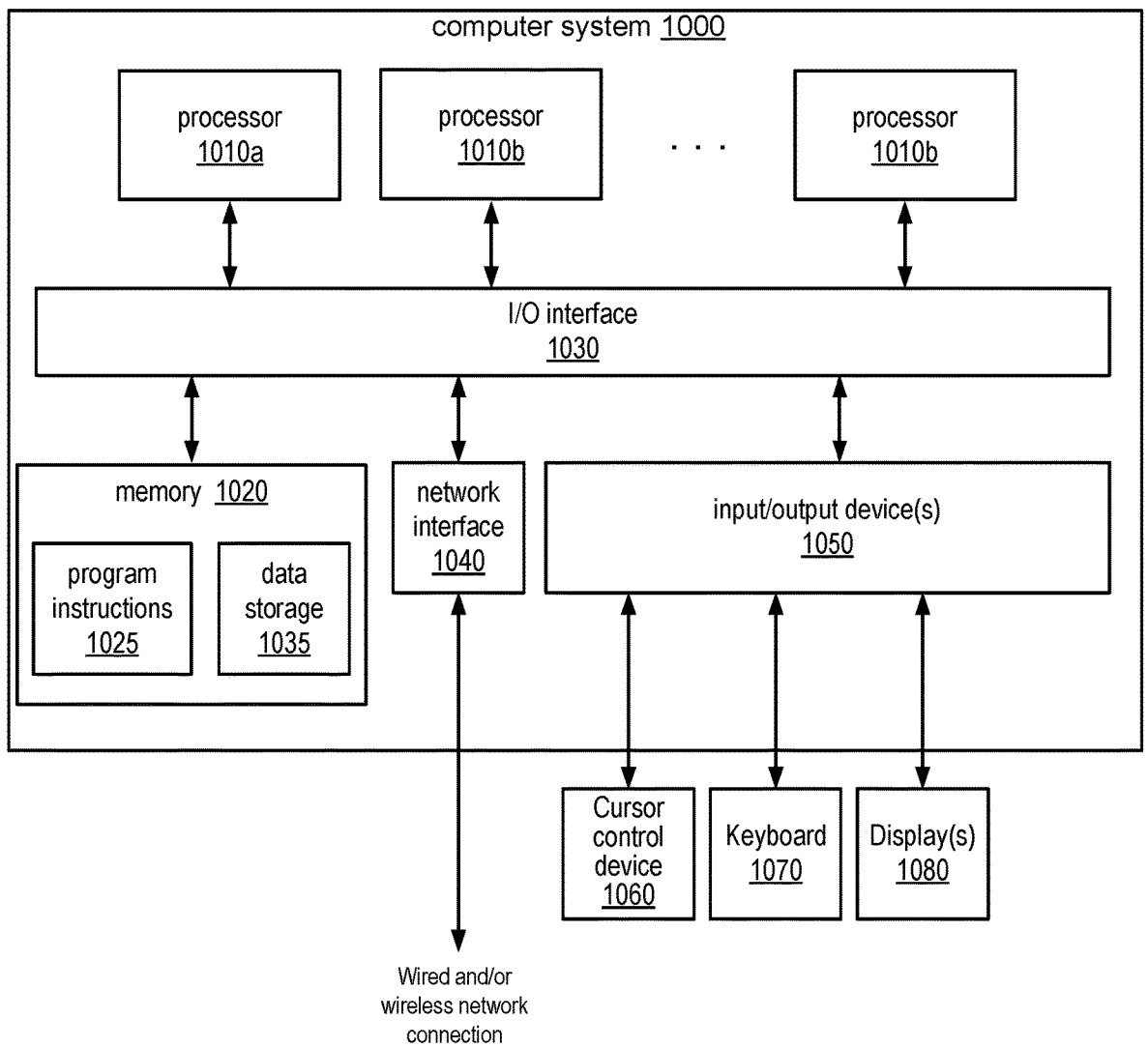
FIG. 10 illustrates an example system configured to implement the various methods, techniques, and systems described herein, according to some embodiments.

As shown in FIG. 10, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the stereo drawing techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a plurality of nodes, respectively comprising at least one processor and a memory, configured to implement a data warehouse, the data warehouse configured to:
receive a query directed to two or more columns of a table stored in a sorted order across a plurality of storage locations according to a multi-column index;
determine a predicate value for the query from interleaving bits of data from the two or more columns included in the multi-column index; and
read one or more of the plurality of storage locations to return a result for the query that satisfies the predicate value, wherein the one or more storage locations are identified as storing data with respective index value ranges for the multi-column index that include the predicate value.

2. The system of claim 1, wherein to determine the predicate value for the query the data warehouse is configured to apply an order preserving compression technique to the data from the two or more columns.

3. The system of claim 2, wherein to apply the order preserving compression technique to the data, the data warehouse is configured to apply column data hierarchy to a particular one of the two or more columns in order to group data in the particular one of the one or more columns according to the column data hierarchy.

4. The system of claim 1, wherein the query is directed to a column of the table not included in the multi-column index.

5. The system of claim 1, wherein the data warehouse is further configured to determine the one or more storage locations from an evaluation of entries for corresponding index value ranges in metadata structure.

6. The system of claim 1, wherein the data warehouse is further configured to:
generate the multi-column index for the table in response to a request received from a client that identifies the two or more columns.

7. The system of claim 1, wherein the data warehouse is further configured to:
generate the multi-column index for the table in response to identifying the two or more columns based on a number of times the two or more columns are used as predicates in queries directed to the table.

8. A method, comprising:
receiving, at a database, a query directed to two or more columns of a table stored in a sorted order across a plurality of storage locations according to a multi-column index;
determining, by the database, a predicate value for the query from interleaving bits of data from the two or more columns included in the multi-column index; and
reading, by the database, one or more of the plurality of storage locations to return a result for the query that satisfies the predicate value, wherein the one or more storage locations are identified as storing data with respective index value ranges for the multi-column index that include the predicate value.

9. The method of claim 8, wherein determining the predicate value for the query comprises applying an order preserving compression technique to the data from the two or more columns.

10. The method of claim 9, wherein applying the order preserving compression technique to the data comprises applying column data hierarchy to a particular one of the two or more columns in order to group data in the particular one of the one or more columns according to the column data hierarchy.

11. The method of claim 8, wherein the query is directed to a column of the table not included in the multi-column index.

12. The method of claim 8, further comprising determining the one or more storage locations from an evaluation of entries for corresponding index value ranges in metadata structure.

13. The method of claim 8, further comprising generating the multi-column index for the table in response to a request received from a client that identifies the two or more columns.

14. The method of claim 8, further comprising:
generating the multi-column index for the table in response to identifying the two or more columns based on a number of times the two or more columns are used as predicates in queries directed to the table.

15. One or more non-transitory, computer-readable storage media storing program instructions that when executed on or across one or more computing devices cause the one or more computing devices to implement:
receiving a query directed to two or more columns of a table stored in a sorted order across a plurality of storage locations according to a multi-column index;
determining a predicate value for the query from interleaving bits of data from the two or more columns included in the multi-column index; and
reading one or more of the plurality of storage locations to return a result for the query that satisfies the predicate value, wherein the one or more storage locations are identified as storing data with respective index value ranges for the multi-column index that include the predicate value.

16. The one or more non-transitory, computer-readable storage media of claim 15, wherein, in determining the predicate value for the query, the one or more program instructions cause the one or more computing devices to implement applying an order preserving compression technique to the data from the two or more columns.

17. The one or more non-transitory, computer-readable storage media of 16, wherein, in applying the order preserving compression technique to the data, the one or more program instructions cause the one or more computing devices to implement applying column data hierarchy to a particular one of the two or more columns in order to group data in the particular one of the one or more columns according to the column data hierarchy.

18. The one or more non-transitory, computer-readable storage media of 15, wherein the query is directed to a column of the table not included in the multi-column index.

19. The one or more non-transitory, computer-readable storage media of 15, wherein the one or more non-transitory, computer-readable storage media store further program instructions when executed on or across the one or more computing devices cause the one or more computing devices to further implement determining the one or more storage locations from an evaluation of entries for corresponding index value ranges in metadata structure.

20. The one or more non-transitory, computer-readable storage media of 19, wherein the one or more non-transitory, computer-readable storage media store further program instructions when executed on or across the one or more computing devices cause the one or more computing devices to further implement generating the multi-column index for the table in response to a request received from a client that identifies the two or more columns.

* * * * *